United States Patent
Colin

(10) Patent No.: US 6,854,376 B2
(45) Date of Patent: Feb. 15, 2005

(54) DEVICE FOR ACTUATING A LEAST PISTON AND METHOD FOR DETECTING FAILURE IN A DEVICE

(75) Inventor: Bruno Colin, Marcy l'Etoile (FR)

(73) Assignee: Biomerieux S.A., Marcy l'Etoile (FR)

(*) Notice: Subject to any disclaimer, the term of this patent is extended or adjusted under 35 U.S.C. 154(b) by 46 days.

(21) Appl. No.: 10/258,021

(22) PCT Filed: Apr. 23, 2001

(86) PCT No.: PCT/FR01/01240
§ 371 (c)(1),
(2), (4) Date: Jan. 21, 2003

(87) PCT Pub. No.: WO01/80999
PCT Pub. Date: Nov. 1, 2001

(65) Prior Publication Data
US 2004/0035289 A1 Feb. 26, 2004

(51) Int. Cl.[7] ............................................. F01B 25/26
(52) U.S. Cl. ............................ 92/5 R; 92/129; 92/140
(58) Field of Search ......................... 92/5 R, 129, 140

(56) References Cited

U.S. PATENT DOCUMENTS

| 3,661,053 | A | * | 5/1972 | Rich ............................ 91/275 |
| 3,975,960 | A |   | 8/1976 | Croslin ...................... 73/425.6 |
| 4,192,723 | A | * | 3/1980 | Laude et al. ................. 205/248 |
| 5,122,628 | A | * | 6/1992 | McLelland et al. ....... 200/83 Y |
| 5,704,268 | A | * | 1/1998 | Hinchliffe ......................... 91/1 |

FOREIGN PATENT DOCUMENTS

GB         2 064 700         6/1981

* cited by examiner

*Primary Examiner*—Hoang Nguyen
(74) *Attorney, Agent, or Firm*—James C. Lydon

(57) ABSTRACT

A device (1) for actuating at least one piston (2) moving axially in the bore (3) of a body (4), the piston (2) being driven by the longitudinal or curved movement (F2) of a control arm (5). Also disclosed is a method for detecting a failure in a device (1) having an intermediary element (6), located between the piston (2) and the control arm (5), this intermediary element (6) being also used as an alarm means should the intermediary element (6) be missing between the piston (2) and the arm (5). The invention is particularly applicable in the field of diagnosis.

11 Claims, 3 Drawing Sheets

DEVICE FOR ACTUATING A LEAST PISTON AND METHOD FOR DETECTING FAILURE IN A DEVICE

This application is a U.S. National Stage of International application PCT/FR01/01240, filed Apr. 23, 2001 and published on Nov. 1, 2001 in the French Language.

DESCRIPTION

This invention concerns a device for actuating at least one piston moving axially in the bore of a body, the piston being driven by a longitudinal or curved movement of a control arm. The invention also concerns a method for detecting a failure in such a device.

Prior art consists of apparatuses in which the piston co-operates with a control arm through an intermediary element such as a ball. Two cases are to be considered. In the first case, the ball cannot exit the recess where it is located, whether it be through crimping or special construction (stop, flange, wedge, . . . ).

However, this kind of apparatus is more expensive to manufacture due to the additional operations to be performed at the time of installation and to the additional components that are required. In addition, should a problem occur, disassembling the apparatus is more difficult since there is a greater number of components and additional items are required for fastening said components to one another.

In the second case, the ball is free, that is to say it is placed at the location where it must be active, and is simply centered by known means such as blind hole, through hole with two different diameters, or machined boss, . . .

The main disadvantage of this embodiment lies in the possible loss of the ball, which causes the piston movement to stop, and forces the piston to remain inactive. This problem may be especially annoying in automated devices, e.g. automated biological diagnosis devices, in which the piston is associated with a syringe or a pipette enabling a biological liquid to be sampled. In this kind of automated device, one often finds several pistons arranged in parallel and the assembly is enclosed within a housing that does not allow the device's operation to be viewed. Moreover, if each piston is not associated to a sensor meant for detecting its activation, which is very expensive, a failure caused by the loss of the ball cannot be detected insofar as the absence of the ball does not prevent the automated device from operating. This may induce false negative or positive results, with possibly quite harmful consequences for the patients.

In accordance with this invention, the proposed device and method are intended to overcome these disadvantages.

To this end, this invention concerns a device for actuating at least one piston moving axially in the bore of a body, the piston being driven by the longitudinal or curved movement of a control arm, characterized in that it has an intermediary element, located between the piston and the control arm, this intermediary element also being used as an alarm means should said intermediary element be missing between said piston and said arm.

According to an alternate embodiment, when the intermediary element is missing between the piston and the arm, this element is in contact with a recovering means, this contact being detectable.

According to another alternate embodiment, the intermediary element is missing between the piston and the arm as a result of the attractive action of a recovery means and/or the ejection effect produced by a dislodging means on said element.

According to a first embodiment, the intermediary element is a ball.

According to a second embodiment, the intermediary element is a metal ball and the recovery means is a magnet.

According to the alternate embodiment, and regardless of the embodiment, the recovery means is associated with a recess which facilitates the recovery of the element.

Yet still according to the alternate embodiment and regardless of the embodiment, the recovery means and/or the recess is(are) associated with the control arm.

Preferably, the recovery means and/or the recess is(are) located between two adjacent intermediary elements.

Regardless of the embodiment, the dimensions of the intermediary element, and notably the ball diameter, are greater than the distance separating the body from the control arm, at the level of the recovery means, when they are close to one another.

This invention also concerns a method for detecting a failure in a device, as described above, the method consisting in operating the device in a normal way and detecting abnormal kinematics of said device.

Preferably, the detection of abnormal kinematics of the device is due to the presence of the intermediary element located between the body and the control arm of said device, notably at the level of the recovery means.

The accompanying drawings are given by way of example and are not to be taken as limiting in any way. They are intended to make the invention easier to understand.

Figure 7:
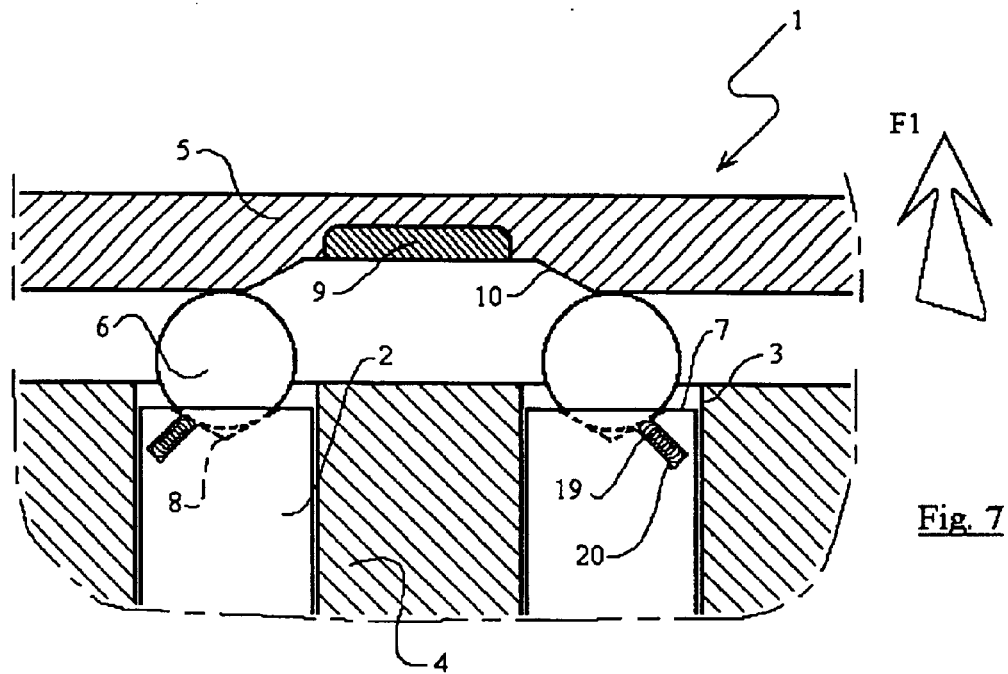
FIG. 7 represents a partial cross-sectional view of a second embodiment of this invention, showing the upper portion of two pistons, each piston being in position before being actuated by balls, in turn actuated through a control arm.
Figure 8:
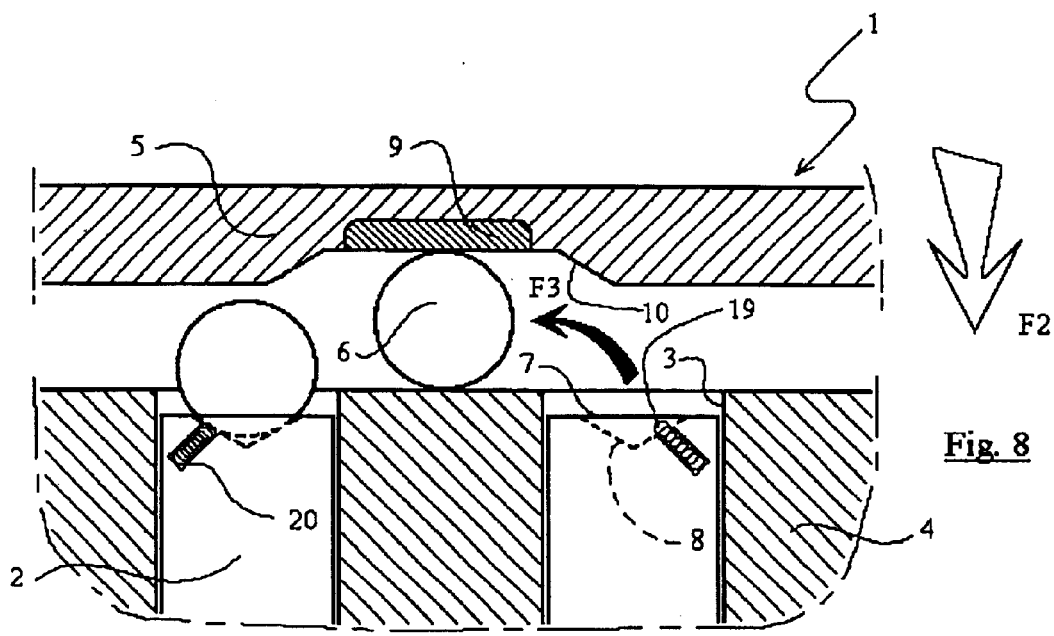

Finally, FIG. 8 represents a partial cross-sectional view according to FIG. 7, when the control arm actuates the pistons and when there is a problem with the movement transmission balls, as one of the balls has escaped.

Figure 1:
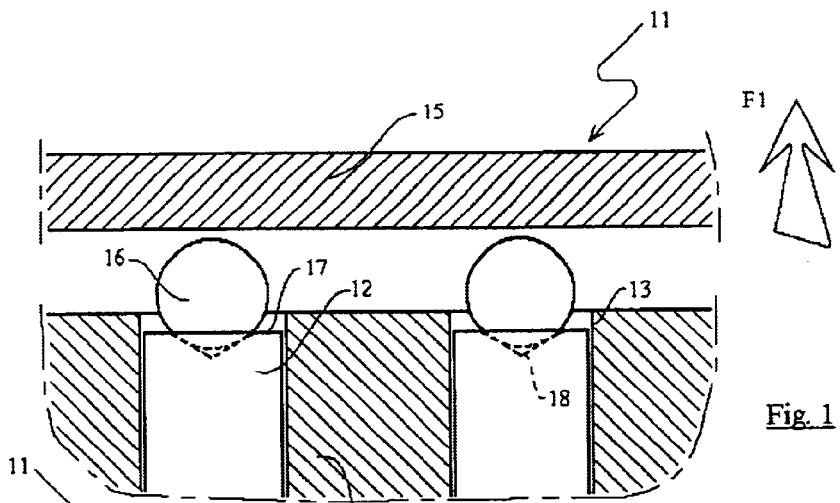
FIG. 1 represents a partial cross-sectional view showing the upper portion of two pistons, each piston being in position before being actuated by balls, in turn actuated through a control arm, according to a specific, yet representative, mode of prior art.
Figure 2:
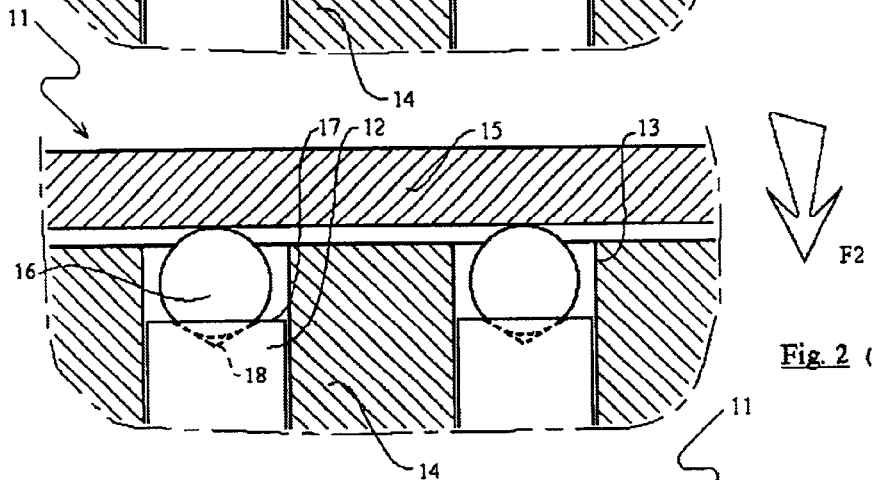
FIG. 2 represents a partial cross-sectional view according to FIG. 1, when the control arm actuates the pistons and when there is no problem with the movement transmission balls.
Figure 3:
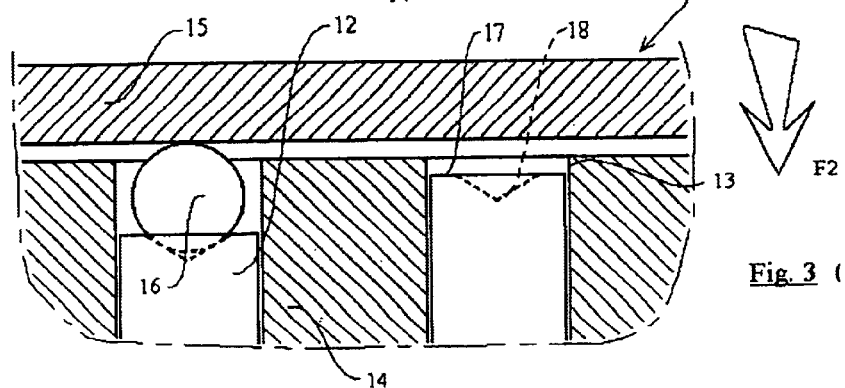
FIG. 3 represents a partial cross-sectional view according to FIG. 1, when the control arm actuates the pistons and when there is a problem with the movement transmission balls, as one of the balls has escaped.

FIGS. 1 through 3 represent the closest prior art known to the applicant. In this prior art, the device 11 makes it possible to actuate at least two mobile pistons 12 located in two parallel bores 13. These bores 13 are made in the body 14 of said device 11.

The upper face 17 of each piston 12 has a centering means 18 usually consisting of a concave recess 18 which is cone-shaped but may also have different shapes. This centering means 18 receives an intermediary element 16 which consists of a ball 16, according to the embodiment of prior art presented in FIGS. 1 through 3. The diameter of the ball 16 is less than that of the piston 12, in turn less than that of the bore 13.

The assembly made up of the ball 16 and the piston 12 can thus move in the direction of the arrows F1 and F2. The movement in the direction of F1, i.e. when the mobile piston 12 moves away from a control arm 15, is driven by any known means in prior art, such as a recoil spring, for example. The movement in the direction of F2, i.e. when said mobile piston 12 moves closer to the control arm 15, is performed by simply moving the control arm 15. This movement in the direction of F2 may be longitudinal, i.e. coaxial with the direction of the movement that will be generated on the piston 12, or curved if, for example, the control arm 15 is installed on the body 14, directly or indirectly, through an articulation or rotation axis not shown in the figures.

It is clear that, when the balls are present, there is no problem, and the two pistons will be moved in the direction of F2, as is well shown in FIG. 2.

On the other hand, when one of the balls 16 has gotten away, which is the case shown in FIG. 3, one can note that the control arm 15 has moved down in the direction of F2 and only pushed down the piston 12, on the left side of the figure. The piston 12 on the right side of the figure did not move at all. Yet, the absence of the ball did not hamper the movement of said arm 15. Therefore, neither the user nor the software that implements the device 11 can detect that said ball 16 is missing.

Figures 4, 5, 6:
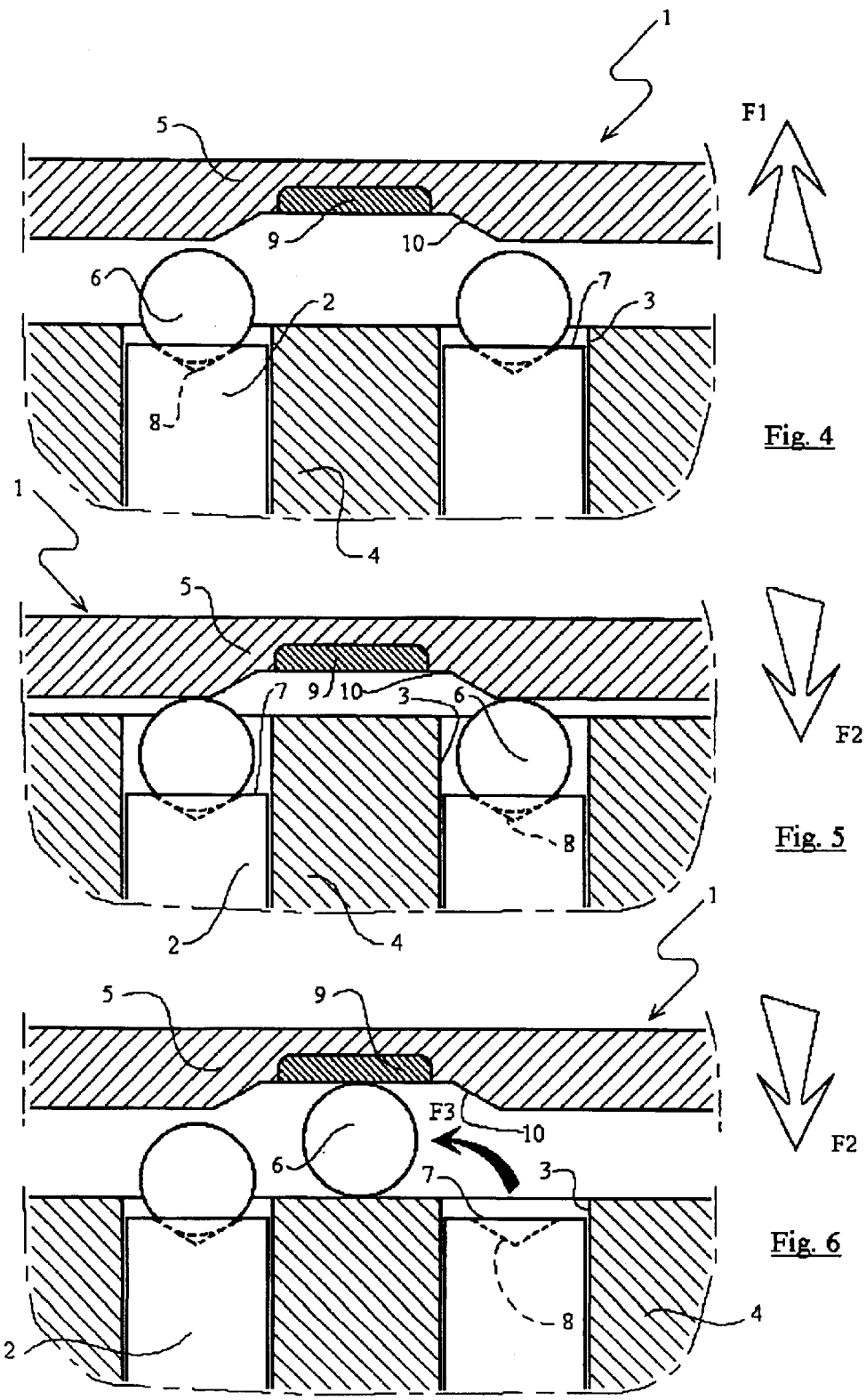
FIG. 4 represents a partial cross-sectional view of a first embodiment of this invention, showing the upper portion of two pistons, each piston being in position before being actuated by balls, in turn actuated through a control arm.
FIG. 5 represents a partial cross-sectional view according to FIG. 4, when the control arm actuates the pistons and when there is no problem with the movement transmission balls.
FIG. 6 represents a partial cross-sectional view according to FIG. 4, when the control arm actuates the pistons and then there is a problem with the movement transmission balls, as one of the balls has escaped.

According to this invention, the whole set of features quoted for FIGS. 1 through 3 applies to FIGS. 4 through 6 for the first embodiment of this invention and to FIGS. 7 through 8 for the second embodiment of this invention. Nonetheless, the numbers differ slightly.

In this manner, according to the first embodiment of the invention, one finds again the device 1 that enables the two mobile pistons to be actuated. Each mobile piston 2 is housed in a bore 3 provided within the body 4 that makes up the device 1 together with the control arm 5. The intermediary element is referenced 6 and it also consists of a ball 6. The upper surface 7 of the piston 2 also has a centering means 8, the structure of which is substantially identical to that of the means shown in FIGS. 1 through 3.

Still according to FIGS. 4 through 6, one can note, however, that there is a substantial change that enables the method according to the invention to be implemented. This structural difference defines the device 1 according to this invention against the device 11 in prior art. This way, one can note that the lower face in FIGS. 4 through 6 of the control arm 5 features a recess 10 which is located between the two balls 6 of the two pistons 12 located close to one another.

At the bottom of the recess 10, there is a means 9 for recovering the intermediary element 6. According to a preferred embodiment, this recovery means 9 consists of a magnet 9. In that case, the ball 6 is made of metal in order to co-operate with the magnet 9 if leaks occur, in the direction of F3 as is well shown in FIG. 6.

It is clear that, when the ball 6 is between the body 4 and the control arm 5, near the recovery means 9, the ball 6 will prevent said arm 5 from moving down in the direction of F2, which will tend to disrupt the kinematics of the arm 5. In such a case, it will be much easier for the user or the software that controls the device 1, to detect a malfunction and to quickly diagnose the reasons for this malfunction.

According to the second embodiment, shown in FIGS. 7 and 8, it can be seen that the first embodiment in FIGS. 4 through 6 can be provided with an enhancement which further improves the dislodging of the ball 6 in the direction of F3 and the detection of said ball 6 due to its wedging between the body 4 and the control arm 5 of the device 1 according to the invention.

In this second embodiment, a means 19 for dislodging the element 6, in the form of a spring, is present and facilitates the expulsion in the direction of F3 of said element towards the recovery means or magnet 9. This dislodging means 19 consists of a spring 19 that is lodged in a housing 20. When the ball 6 is present between the control arm 5 and the centering means 8 located at the surface 7 of the piston 2, the spring 19 is subjected to a low compression, e.g. a few tens of grams, while the pressure exerted by said arm 5 is greater, that is to say it ranges from 100 grams to a few kilograms.

The orientation of the spring 19, and therefore that of the housing 20, is such that when the ball 6 can escape in the direction of F3, said spring 19 is no longer constrained by the arm 5 and therefore the ball 6 can escape towards the magnet 9. To this end, the longitudinal axis of said spring 19, and thus that of said housing 20, crosses the recovery means 9. In the embodiment of FIGS. 7 and 8, a recovery means 9 is present between the two balls 6, and the two related springs 19 have longitudinal axes that cross each other. It is also possible that a recovery means 9 be associated with a single ball 6.

REFERENCES

1. Device for actuating at least one mobile piston 2 according to the invention
2. Mobile piston according to the invention
3. Bore in the body 4 where the piston 2 moves according to the invention
4. Body of the device 1 according to the invention
5. Control arm of the device 1 according to the invention
6. Intermediary element or ball according to the invention
7. Upper surface of piston 2 according to the invention
8. Centering means of the element 6 on the surface 7 according to the invention
9. Means for recovering the element 6 or magnet according to the invention
10. Recess near the recovery means 9 according to the invention
11. Device for actuating at least one mobile piston 12 according to prior art
12. Mobile piston according to prior art
13. Bore in the body 14 where the piston 12 moves according to prior art
14. Body of the device 11 according to prior art
15. Control arm of the device 11 according to prior art
16. Intermediary element or ball according to prior art
17. Upper surface of the piston 12 according to prior art
18. Centering means of the element 16 on the surface 17 according to prior art
19. Means for dislodging the element 6 or spring according to the invention
20. Housing containing the means 19

F1. Direction of the movement of the control arm 5 or 15 when moving away from the mobile piston 2 or 12

F2. Direction of the movement of the control arm 5 or 15 when moving closer to the mobile piston 2 or 12

F3. Dislodging of element 6

What is claimed is:

1. A device for actuating at least one piston moving axially in the bore of a body, the piston being driven by the longitudinal or curved movement of a control arm, further comprising an intermediary element, located between the piston and the control arm, this intermediary element also being used as an alarm means should said intermediary element be missing between said piston and said arm.

2. The device of claim 1, wherein, when the intermediary element is missing between the piston and the arm, this intermediary element is in contact with a recovery means, this contact being detectable.

3. The device of claim 1, wherein, when the intermediary element is missing between the piston and the arm as a result of an attractive action exerted by the recovery means and/or an ejection effect of said intermediary element by a dislodging means.

4. The device of claim 1, wherein the intermediary element comprises a ball.

5. The device of claim 2, wherein the intermediary element comprises a metal ball and the recovery means comprises a magnet.

6. The device of claim 2, wherein the recovery means is associated to a recess which facilitates recovery of the intermediary element.

7. The device of claim 2, wherein either the recovery means or the recess, or both, is(are) associated with the control arm.

8. The device of claim 2, wherein the recovery means or the recess, or both, is(are) located between two adjacent intermediary elements.

9. The device of claim 1, wherein, when the dimensions of the intermediary element are greater that a distance between the body and the control arm, near the recovery means, when the body and the control arm are moved closer to one another.

10. A method for detecting a failure in a device, comprising operating the device of claim 1 in a normal way, and detecting an abnormal kinematics of said device.

11. The method of claim 10, wherein detection of abnormal kinematics of said device is due to the presence of an intermediary element located between the body and the control arm of said device near the recovery means.

* * * * *

UNITED STATES PATENT AND TRADEMARK OFFICE
CERTIFICATE OF CORRECTION

PATENT NO. : 6,854,376 B2
DATED : February 15, 2005
INVENTOR(S) : Bruno Colin

It is certified that error appears in the above-identified patent and that said Letters Patent is hereby corrected as shown below:

Title page, Item [54] and Column 1, lines 1-3,
Title, please rewrite as follows:
-- DEVICE FOR ACTUATING AT LEAST A PISTON AND METHOD FOR DETECTING FAILURE IN A DEVICE --

Title page,
Item [30], Foreign Application Priority Data, please insert as follows:
-- [30]    Foreign Application Priority Data
April 21, 2000  (FR) ....................................................... 00/05149 --

Signed and Sealed this

Seventeenth Day of May, 2005

JON W. DUDAS
*Director of the United States Patent and Trademark Office*